United States Patent Office 3,086,017
Patented Apr. 16, 1963

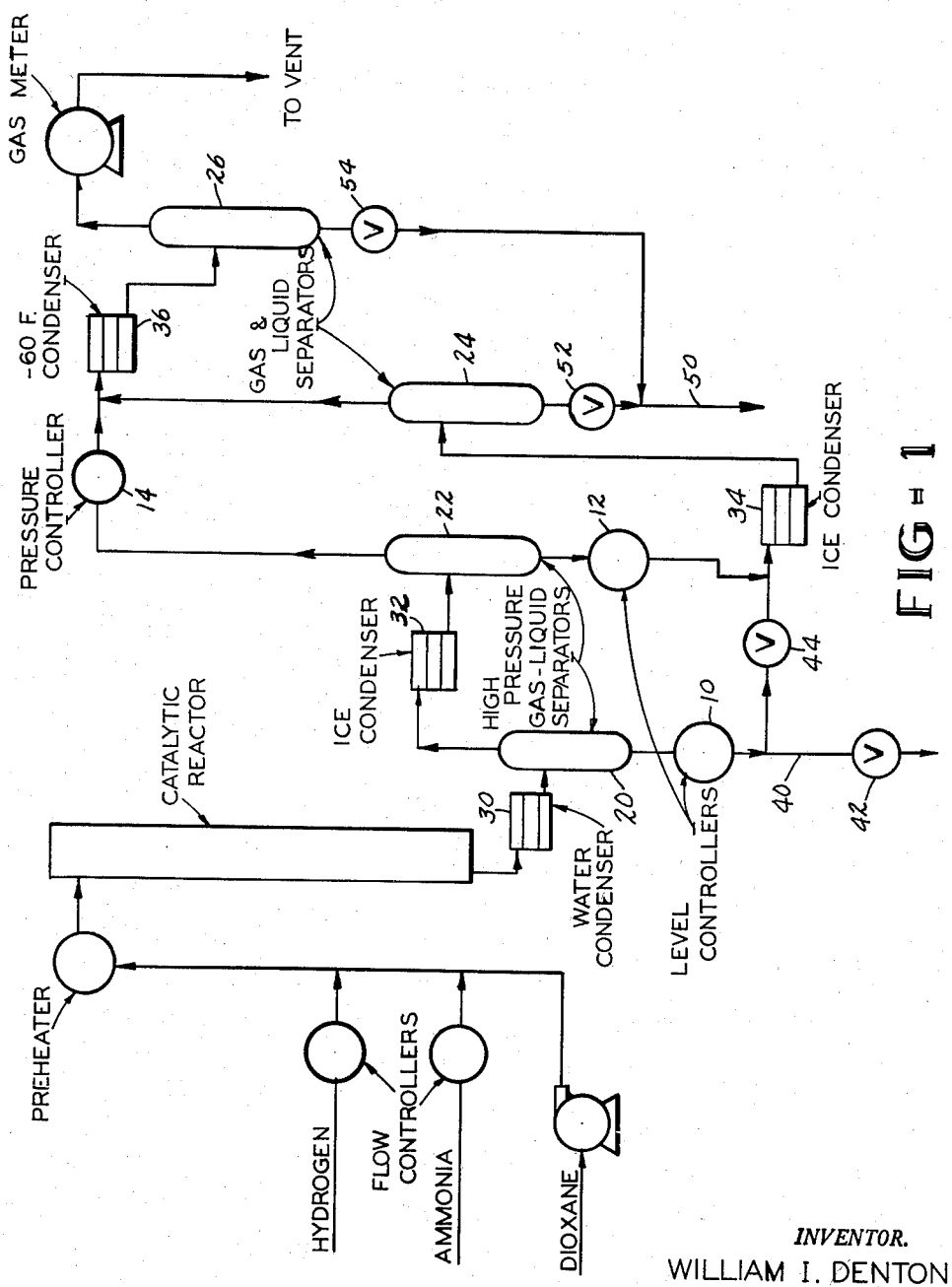

3,086,017
CATALYTIC PROCESS FOR PRODUCING NITROGEN CONTAINING COMPOUNDS
William I. Denton, Cheshire, Conn., assignor to Olin Mathieson Chemical Corporation, a corporation of Virginia
Filed June 1, 1959, Ser. No. 817,399
6 Claims. (Cl. 260—247)

The subject process relates to the catalytic process for the production of acetonitrile and other nitrogen compounds from dioxane and ammonia.

Para-dioxane has the following structural formula:

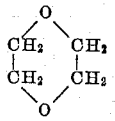

When para-dioxane is heated to temperatures in the range of 400 to 500° C. in the absence of air, ammonia, or other reactant gases, some decomposition may occur to form products which are the result of the opening of the ring and the dehydration of the resulting fractions. For example, ethers, alcohols and other products may result which are component parts of difficultly separable mixtures. In general, the products which form are mixtures of resins which are uneconomically difficult or impossible to fractionate into valuable components.

However, it has now been found that in contrast with the above, when dioxane is reacted with ammonia in the presence of a particular catalyst, economically separable nitrogen-containing products are produced in mixtures in definite ratios. Further, in accordance with this invention these ratios can be adjusted and controlled to favor the production of desired products. Among the products which can be formed in economically separable mixtures pursuant to the method of this invention are morpholine, diethanol amine, acetonitrile, and piperazine.

It was not at all apparent that useful or valuable products such as acetonitrile would result from the procedures described here nor that the concentrations in which such products could be produced would make the procedures of economic value. Nevertheless, the possibility of producing acetonitrile and other valuable compounds in economically significant yields has been demonstrated and forms the basis of the subject application.

One of the objects of the invention is to provide an economic process for producing nitrogen-containing organic compounds in relatively high yields.

A specific object is to produce a compound such as acetonitrile in relatively high concentration in a reaction mixture.

Other objects will be in part apparent and in part pointed out in the description which follows.

The method by which these objects are attained will be made clearer by reference to the illustrative examples which follow. The general method which they illustrate is one for reacting dioxane with ammonia in the gaseous phase to produce derivatives containing relatively high proportions of nitrogen-containing compositions. In one of its broader aspects the method comprises at least partially catalytically reacting dioxane in the presence of ammonia and of a catalyst.

Reference is made to the FIGURE in describing the steps of the process as they were carried out in the examples which follow. Dioxane was introduced by a metering pump into a manifold from which it went into a preheater and thence to a catalytic reactor. A Milton Roy "mini" pump was used for the metering and is shown in the figure as a pump on the dioxane line.

Ammonia was metered, also at elevated pressure, into and through the same units using a calibrated capillary, a differential pressure cell and a flow controller, the latter unit being shown in the figure.

The apparatus also included a supply of high pressure hydrogen and a suitable calibrated capillary unit, differential pressure cell and flow controller for regulating its introduction into the system.

The catalyst reactor was made of type 316 stainless steel and held a 120 cc. bed of catalyst. Catalyst temperature was controlled by an electric heater, not shown, and was measured at the top, middle, and bottom of the catalyst bed.

As is evident from the figure, the reactants were mixed in the entry manifold and were then passed to the preheater. In this unit they were heated to the reaction temperature and, after leaving this unit, they were passed into and downward through the catalyst bed in the reactor.

The products leaving this reactor passed through a water cooled condenser, so labelled, and to a high pressure gas-liquid separator 20, where most of the liquid product was recovered.

The non-condensed gases passed through an ice condenser 32, so labelled, to a second gas-liquid separator 22 where any entrained liquid was removed.

The pressure on the reactor side of the three regulating valves 10, 12, and 14 was high and it is in passing through these valves that it was lowered.

Non-condensed gases which had passed through the ice condenser were released to atmospheric pressure through a conventional pressure release valve.

The liquid product from the first and second gas-liquid separators, 20 and 22, was also released to atmospheric pressure through valves 10 and 12 respectively, and passed through a second ice condenser 34 into a third gas-liquid separator 24.

When the run pressure exceeded 150 lb./sq. inch, ammonia and gas such as propylene are condensed and removed from the process stream in the first two separators 20 and 22. These gases vaporized when the liquids were passed through valves 10 and 12 as the pressure was reduced to atmospheric. The gases thus formed were then passed through the third gas-liquid separator 24. After passing from this unit they were mixed with gases from the back pressure regulator 14 and passed through a Dry Ice condenser 36 and low temperature separator 26 for final removal of entrained or condensable gases.

The remaining portion of non-condensed gases from this Dry Ice separator were metered and vented after having passed through the last gas-liquid separator 26 and after an analytical sample had been taken.

Liquid ammonia and other low-boiling materials were removed from the gas stream in passing through the condenser operated at —60° F. The liquid products from this condenser were collected in the low temperature separator 26 and were periodically removed, weighed and stabilized by suitable reactions to recover any entrapped heavy reaction products. Where such materials were not found to be condensed to a significant degree, the use of this condenser was omitted.

EXAMPLE I

In the normal operation of the apparatus described above the reactants were run through the apparatus until the flow rates and temperatures had been stabilized at the desired points. When this point was reached, all liquid products were drained from the system.

The liquid product was removed from the system through the drain line 40 by operation of valves 42 and 44. Liquid product may also be removed through drain line 50 by suitable operation of valves 52 and 54.

After the system reached equilibrium and was drained of liquids, the run was started. Everything going into or coming out of the unit during the run was then measured.

In a six hour run the following operating conditions were employed.

Temperature of catalyst bed__ 430° C.
Pressure of gas in contact with
 catalyst_____ Atmospheric.
Ratio of ammonia to dioxane__ 8:1.
Space velocity=volumes of
 dioxane (liquid)/volume
 of catalyst/hour_____ 1.
Residence time_____ 0.6 sec.
Catalyst_____ Regenerated 10% MoO₃ on alumina.
Dioxane input_____ 914 gms.
Ammonia input_____ 1065 gms.

The products of this run consisted of 1065 grams of liquid product and 49 moles of non-condensed gases.

The liquid product was heated to strip out the NH₃. About 155 grams of NH₃ were removed and about 896 grams of liquid product remained. Analysis of the product after stripping of ammonia showed 5.16% nitrogen and 20.8% H₂O.

The non-condensed gases, on analysis by mass spectrometry, were found to contain the components shown in Table I.

*Table I*

MASS SPECTROMETER ANALYSIS, NON-CONDENSED GASES

| Gas | Mole, percent | Moles | Molecular weight | Grams |
|---|---|---|---|---|
| H₂ | 5.2 | 2.55 | 2 | 5 |
| NH₃ | 71.3 | 35.93 | 17 | 595 |
| N₂ | 16.6 | 8.14 | 28 | 228 |
| C₂H₄ | 3.0 | 1.47 | 28 | 41 |
| CH₃CN | 2.4 | 1.18 | 41 | 49 |
| Dioxane | 1.5 | 0.74 | 88 | 64 |

Separation of the products into the component parts gave a 33 mole percent (15 wt. percent) yield of acetonitrile, 10 mole percent (10 wt. percent) morpholine and smaller amounts of higher boiling nitrogen compounds.

EXAMPLE II

In order to establish the basis for the formation of the remarkable group of products being produced as a result of the catalytic heating steps described above, a number of tests were conducted to determine the factors which did, and also those which did not contribute to the formation of these products.

For these runs the following conditions were employed: A temperature of 425° C.; a space velocity of 1 volume of dioxane per volume of catalyst per hour; a molar ratio of ammonia to dioxane of about 6; and atmospheric pressure. The procedure used in making these determinations is that described in Example I. The results of these tests are given in Table II below.

*Table II*

EFFECT OF AMMONIA AND CATALYST $$\text{Wt. percent yield per pass} = \frac{\text{Gm. product} \times 100}{\text{Gm. dioxane charged}}$$

| Run | Catalyst | Water | Dioxane | Morpholine | Acetonitrile | B.P.>105° C. |
|---|---|---|---|---|---|---|
| (1) | 10% MoO₃ on Alumina (Av. of 2 runs). | 18.5 | 51.7 | 5.0 | 21.0 | ª 7.0 |
| (2) | Activated Alumina | 19.8 | 54.7 | 15.0 | 1.7 | ᵇ 11.7 |
| (3) | 10% MoO₃ on Alumina (N₂ used instead of NH₃). | 3.8 | 82.0 |  | (ᶜ) | ᵈ 9.3 |

ª Contains morpholine, piperazine and higher boiling nitrogen compounds.
ᵇ Contains high boiling resins, chiefly oxygenated in character.
ᶜ Contains 4.9% low boiling oxygenated compounds, but contains no acetonitrile because no ammonia was used in this run.
ᵈ Contains oxygenated resinous compounds.

The following was indicated by the runs listed in Table II.

*Run 1.*—The heating of dioxane and ammonia over the molybdena-alumina catalyst produced good yields of nitrogen-containing compounds.

*Run 2.*—Activated alumina alone was not effective as a catalyst for producing nitrogen-containing compounds. Small amounts of acetonitrile and large amounts of high boiling resins chiefly oxygenated in character were produced.

*Run 3.*—Use of the molybdena-alumina catalyst in the absence of ammonia resulted in conversion of only a small part of the dioxane. Thus only about 18% of the dioxane was converted and the product formed was an oxygenated resin. In contrast to this, approximately 50% of the dioxane was converted under the same conditions with ammonia added, most of this showing up as useful nitrogen containing products.

By regulation of the various factors found to be essential to the control of the distribution of the product formed, it is possible to produce acetonitrile, morpholine, piperazine and similar nitrogen compounds and in relatively high yields.

While the procedure is described with particular reference to the molybdena catalyst, it will be appreciated that other catalysts and other conditions may be employed to produce other species in nitrogen-containing compounds in high ratios. Alternate catalysts which may be employed are tungsten oxides and vanadia-alumina.

The processing conditions used may be varied over a wide range. For example, the temperature ranges which are useful in forming the subject compounds are between 350 and 600° C., the greatest control, however, being obtained between 400° C. and 500° C. The pressure used may range anywhere between 1 millimeter and 3000 pounds per square inch or higher for operability, although for economic reasons, pressures from around atmospheric to around 300 pounds per square inch are preferred.

The space velocity as used in this application is intended to describe the volume of a reactant in the liquid state which is passed through a unit volume of catalyst in an hour. Space velocities of from 0.1 to 10 may be used, the space velocity being in part determined by the temperature of operation. For example, at low temperatures a very low space velocity may be employed, whereas the use of the same low space velocity at higher temperatures may lead to decomposition of the dioxane and certain products of the subject process in the catalyst bed and consequent fouling of the catalyst. Therefore, at higher temperatures, higher space velocities are desirable. An increased control over the rate of the reaction may be obtained where the space velocity is maintained in the range of about 0.5 to 5.0.

In addition, the molar ratio of ammonia to dioxane may be varied over wide limits. An excess of ammonia favors the production of the desired products. The most practical molar ratios of ammonia to dioxane are from about 2:1 to about 6:1 althoupgh the process is operable at ratios of from 1:1 to 150:1.

A number of the process variables were investigated individually as it was discovered that they provide a basis for control of the distribution of the various products formed.

The effect of the temperature of heating was determined and the results are given in Table III below. In these determinations a molybdena-alumina catalyst was employed because it catalyzes the dehydration-ammonolysis reaction in addition to its dehydrocyclization activity. The products which formed were separated into the following components:

(1) Those components boiling below the boiling point of dioxane. This product is chiefly acetonitrile.
(2) The water component.
(3) The recovered dioxane component (usually containing some morpholine).
(4) Those components boiling above the boiling point of dioxane. This product is a mixture containing morpholine, piperazine and higher boiling nitrogen and oxygenated products.

identified by mass spectrometric analysis as being chiefly morpholine, piperazine, and pyrazine. In this fraction pyrazine predominates. Morpholine also tends to distill with the unreacted dioxane and must be separated from it in a subsequent operation. In the fraction which boils above 155° C., compounds such as β amino ethyl β hydroxyethyl ether, ethyl pyridine, and similar compounds predominate.

Any reference to alumina herein is intended to include those aluminas, either naturally occurring or chemically formed, which have a surface area in excess of 30 sq. meters/gram and includes such aluminas as bauxite and activated aluminas such as are conventionally used in many commercial catalyst preparations.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

I claim:

1. The method of preparing a compound selected from the group consisting of morpholine and acetonitrile from para dioxane which comprises catalytically reacting para dioxane with ammonia in the gaseous phase, at a temperature of between 350 and 600° C. in the presence of a catalyst selected from the group consisting of molybdena-alumina, a tungsten oxide and vanadia-alumina.

2. The method of preparing a compound selected from the group consisting of morpholine and acetonitrile from para dioxane which comprises catalytically reacting para dioxane with ammonia in the gaseous phase by passing these gases into contact with a catalyst consisting essentially of approximately 10% molybdenum oxide on alumina at a temperature of between 350° and 600° C., a pressure of between 1 millimeter and three thousand pounds per square inch, a space velocity of between about 0.01 and 10 volumes per volume of catalyst per hour, and a molar ratio of ammonia to dioxane of between 1 and 15.

3. The method of claim 2 wherein the selected compound is morpholine.

4. The method of claim 2 wherein the selected compound is acetonitrile.

5. The method of producing acetonitrile from para dioxane which comprises passing a mixture of ammonia

Table III
REACTION OF DIOXANE AND AMMONIA

| Reaction Temp.,a °C. | H₂O, Wt. percent | Dioxane, Wt. percent | Initial Boiling Point 84° C. (Anhydrous—Mainly Acetonitrile) | | | B.P.>100° C. | | |
|---|---|---|---|---|---|---|---|---|
| | | | Yield, Wt. percent | | Percent N in Product | Yield, Wt. percent | | Percent N in Product |
| | | | Par Passb | Ultimatec | | Per Passb | Ultimatec | |
| 200 | 5.5 | 85.5 | 0.0 | -------- | -------- | 9.0 | 64 | -------- |
| 300 | 5.9 | 84.9 | 0.0 | -------- | -------- | 9.2 | 61 | 4.8 |
| 350 | 11.2 | 74.1 | 0.6 | 23 | -------- | 14.0 | 54 | 11.6 |
| 375 | 12.9 | 61.9 | 13.6 | 36 | -------- | 16.0 | 42 | -------- |
| 400 | 17.6 | 58.9 | 13.0 | 31 | 20.0 | 10.3 | 25 | 12.7 |
| 425 | 19.4 | 52.2 | 25.1 | 52 | -------- | 8.0 | 17 | -------- |
| 430 d | 17.9 | 62.6 | 20.2 | 47 | -------- | 5.9 | 16 | 11.8 |
| 450 | 25.3 | 38.4 | 32.9 | 53 | -------- | 13.8 | 22 | 14.1 |
| 450 | 25.4 | 32.4 | 29.9 | 44 | 29.2 | 12.9 | 26 | 14.3 |
| 500 | 30.2 | 19.2 | 33.7 | 42 | 29.9 | 25.4 | 31 | 12.1 |
| 550 | 42 | 0 | 47 | 47 | 23.0 | 26 | 26 | 11.0 | a Reaction conditions: atm. pressure; 1:6 molar ratio-dioxane: NH₃; space velocity=1.0 vol. dioxane per hour per vol. catalyst (residence time of approx. 1.0 sec.); catalyst ⅛″ pellets of 10% MoO₃ on activated alumina.

b $\frac{\text{Gm. Product} \times 100}{\text{Gm. Dioxane Charged}}$ c $\frac{\text{Gm. Product} \times 100}{\text{Gm. Dioxane Charged} - \text{Gm. Dioxane Recovered}}$ d Complete material balance on this run takes gas analysis into account. This was not done on other runs.

As is evident from the results given in Table III, the yield per pass of the low boiling product increases steadily from no yield at a temperature of 300° C., to about 47 weight percent at about 550° C. The optimum ultimate yield for maximum acetonitrile production is reached in the temperature range of 400 to 550° C. The low boiling product was identified by its boiling point, by refractive index measurements, and by infra-red spectrometric analysis. It was found to contain approximately 80% acetonitrile, approximately 5% ethylene imine, and the remainder water.

As is also evident from the table, the yield per pass of the high boiling product does not begin to increase until a temperature of about 450° C. is exceeded. After this temperature is exceeded, the yield per pass of the high boiling fraction rises to about 25 weight percent at a temperature of 500 to 550° C. The further separation of this product revealed that about 40% boils at a temperature of between 105 and 155° C. and that about 60% boils at above 155° C. The material which boils at a temperature between 105 and 155° C. has been and para dioxane into contact with a catalyst consisting essentially of approximately 10% molybdenum oxide on alumina at a temperature of between 400 and 500° C., a pressure of between 1 and 20 atmospheres per square inch, a space velocity of between 0.5 and 5.0 volumes per volume of catalyst per hour, and a molar ratio of ammonia to para dioxane of between 2 and 6.

6. The method of forming acetonitrile from para dioxane which comprises heating ammonia and para dioxane together in the presence of a catalyst consisting essentially of about 10% molybdenum oxide on activated alumina, maintaining the temperature of said catalyst at a temperature of about 425° C., passing said ammonia and para dioxane through a bed of said catalyst at a space velocity of about one volume of para dioxane per volume of catalyst per hour, maintaining the ratio of ammonia to para dioxane at a value of approximately 3 and maintaining the gas at about atmospheric pressure.

References Cited in the file of this patent

UNITED STATES PATENTS 2,557,703   Spillane et al. _____ June 19, 1951

OTHER REFERENCES

German application, Serial No. C10125, printed July 19, 1956.